United States Patent [19]

Hoover

[11] Patent Number: 5,048,401

[45] Date of Patent: Sep. 17, 1991

[54] BARBECUE APPARATUS AND METHOD OF MAKING THE SAME

[76] Inventor: Charles J. Hoover, 51788 Gates Bridge East, Gates, Oreg. 97346

[21] Appl. No.: 493,248

[22] Filed: Mar. 14, 1990

[51] Int. Cl.$^5$ ............................................. A47J 37/04
[52] U.S. Cl. ............................... 99/339; 99/421 HH; 99/421 HV; 99/419; 99/448; 126/25 R; 126/29; 29/401.1; 29/463; 29/469
[58] Field of Search .......... 99/419, 421 HH, 421 HV, 99/340, 339, 447, 448, 449, 450, 467, 482; 126/25 R, 9 R, 29, 30, 26; 29/401.1, 463, 469

[56] References Cited

U.S. PATENT DOCUMENTS

| | | | |
|---|---|---|---|
| 2,094,915 | 10/1937 | Dawson | 99/421 HV |
| 2,542,265 | 2/1951 | Staples | 99/339 |
| 3,040,651 | 6/1962 | Nolte, Jr. | 99/339 |
| 3,943,837 | 3/1976 | Takla | 99/339 |
| 4,112,832 | 9/1978 | Severdia et al. | 99/421 HH |
| 4,334,462 | 6/1982 | Hefling | 99/448 X |
| 4,413,609 | 11/1983 | Tisdale | 126/25 R |
| 4,418,678 | 12/1983 | Erickson | 126/9 R |
| 4,531,505 | 9/1985 | Hait et al. | 126/25 R |
| 4,554,864 | 11/1985 | Smith et al. | 99/482 |
| 4,962,697 | 10/1990 | Farrar | 99/449 |

FOREIGN PATENT DOCUMENTS 568198 10/1957 Italy .................................. 126/25 R Primary Examiner—Timothy F. Simone
Attorney, Agent, or Firm—Olson & Olson

[57] ABSTRACT

A barbecue construction using a pair of dual-type truck wheels, one of the pair forming a lower base member and the other of the pair forming an upper firebox member. The lower wheel is disposed on an underlying ground surface with its wheel hub member facing upwardly, and the upper wheel is disposed, in inverted condition, on the lower wheel so that the upper level is supported by its hub member on the hub member of the lower wheel. The aligned axle bores of each wheel are closed to the passage of air therethrough by a plate arrangement that provides a central axis of rotation of the aligned wheels so that rotation of the upper wheel relative to the lower wheel moves the lug bores associated with the upper wheel into and out of alignment with the lug bores associated with the lower wheel and thereby selectively control the upward passage of air therethrough. The typical openings through the hub member of the upper wheel are closed off by covering them with metal plates, and a handle is provided on the rim member of the upper wheel for controlling the amount of air permitted to the underside of a fire contained in the firebox. Various cooking implements are mounted on the barbecue for various types of cooking, and are provided for adjustable positioning over the firebox.

13 Claims, 2 Drawing Sheets

BARBECUE APPARATUS AND METHOD OF MAKING THE SAME

BACKGROUND OF THE PRIOR ART

This invention relates to barbecues primarily of the outdoor, solid fuel-burning type and more particularly to a barbecue construction which utilizes discarded or damaged dual truck wheels to form the base and the firebox.

Barbecues have been long known in the art, and comprise a variety of types ranging from a simple pit to very elaborate, sometimes sophisticated cooking centers. This invention is primarily concerned with the more heavily used basic constructions found outdoors in federal and state parks, campgrounds, rest stops, picnic areas and the like.

Heretofore, such barbecues have typically comprised brick fire boxes with grills laying over the fire area, or pedestal mounted metal boxes with grills positioned thereon for pots, pans, hot dogs and hamburgers. Generally, for cost reasons, most of these barbecues do not include such amenities as provision for adjusting the height of a grill over the fire, various cooking implements arranged to assist in various different types of cooking, and the like, but more importantly, the constructions of the prior art have necessarily tended to be particularly cost conscious because of the deleterious effects of weather, continued heating and cooling, and most notably, inevitable damage due to vandalism and theft attempts.

Large brick constructions are inefficient and wasteful of fuel, and the potential of vandalism could involve rather significant repair time and associated cost. Metal barbecues have typically been produced with metals that suffer significant warping from continued heating and cooling and deterioration from the outside elements, and as a result, require continual maintenance, repair and replacement. The manufacturing costs have had to be cut to a minimum because of the fact that they are intended for parks and the like where use is free to the public, damage from vandalism is a common occurrence, and because of the great numbers of barbecues purchased for all these areas. Accordingly, durable, efficient and quality barbecue constructions have not been affordable nor provided to the areas that would most greatly benefit from such a construction.

There is therefore experienced an unfulfilled need for efficient, highly durable outdoor barbecues that are of such a construction that they are economical to manufacture and hence to purchase in large numbers, are more resistant to vandalism attempts, and are not susceptible to heat and weather related damage, while also preferably affording the user more control in cooking. Coincidentally, in today's ever increasingly overcrowded landfills and dumps, there is also being experienced a need to utilize the thousands of items that are simply being discarded and are accumulating at an alarming rate. Used dual truck wheels represent a great encumbrance to these places, as these wheels are large, very heavy, not reusable, and do not decompose over time, and hence do nothing more than take up great amounts of space all over the country.

SUMMARY OF THE INVENTION

In its basic concept, this invention provides a barbecue comprising a set of dual truck wheels, one disposed on top of the other, the upper one having its axle bore and wheel dish bores covered, the wheel positioned rotatably on the lower wheel so that, by rotating the upper wheel, the lug bores in both wheels may be brought into and out of alignment with each other, thereby permitting variable control of the introduction of air therethrough and into the fire area contained in the upwardly facing, hollow interior portion of the upper wheel, to selectively control the intensity of the cooking fire.

It is by virtue of the foregoing basic concept that the principal objective of this invention is achieved; namely, the provision of an inexpensive outdoor barbecue of greatly improved construction that utilizes existing, already manufactured, discarded truck wheels to overcome the limitations and disadvantages of outdoor barbecues heretofore available.

Another object and advantage of this invention is the provision of an outdoor barbecue of the class described which provides a construction that utilizes already existing, discarded materials for the greatest part of its construction, thereby advantageously contributing to the environment while also advantageously reducing the cost of materials and labor time in its manufacture.

Another object and advantage of this invention is the provision of an outdoor barbecue of the class described which utilizes a construction which is extremely rugged, and as such is less susceptible to vandalism and the deleterious effects of weather and continual, long-term use.

Still another object and advantage of this invention is the provision of an outdoor barbecue of the class described which may also mount for selective use and variety of cooking implements, such as a grill, spit, pot hook, flatplate and the like for adjustable positioning vertically relative to the fire, for increased control of cooking.

Yet another object and advantage of this invention is the provision of an outdoor barbecue of the class described which is of simplified construction for economical manufacture.

The foregoing and other objects and advantages of this invention will appear from the following detailed description, taken in connection with the accompanying drawings of a preferred embodiment.

DESCRIPTION OF THE PREFERRED EMBODIMENT

Figure 2:
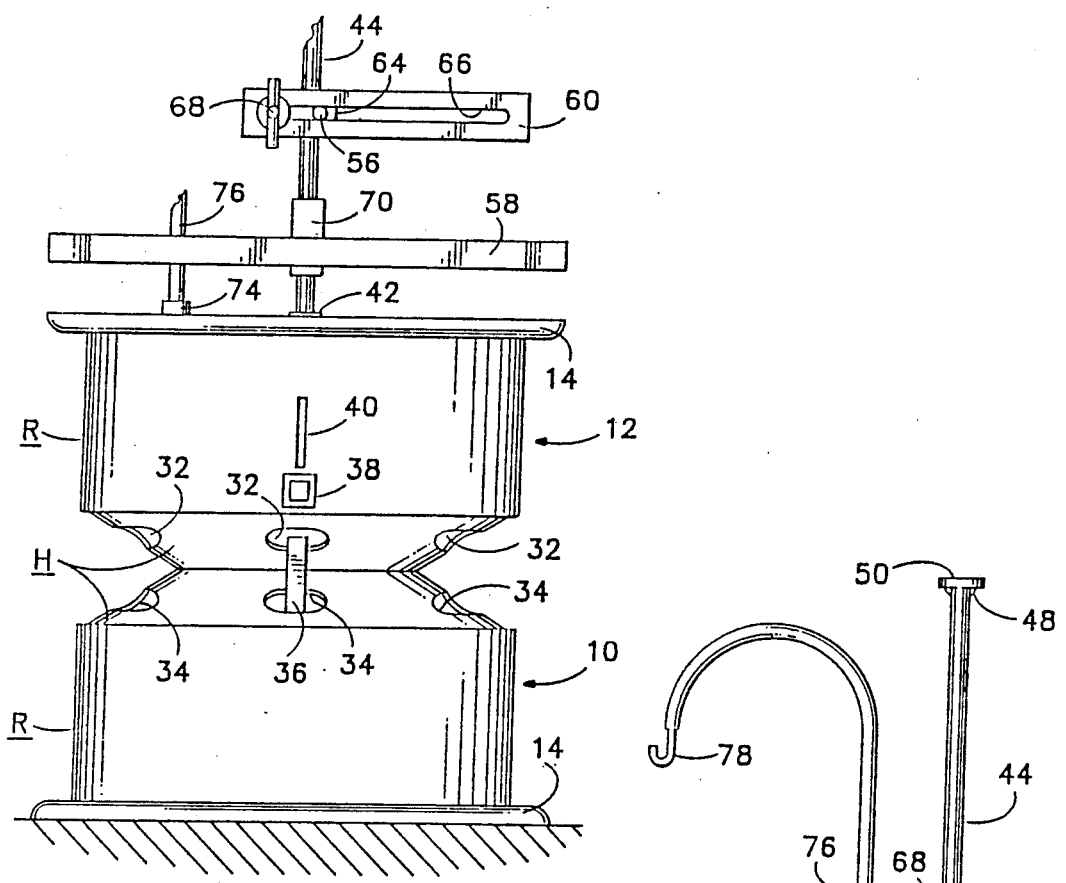
FIG. 2 is a fragmentary front elevation of the outdoor barbecue as viewed from the left in FIG. 1.

In essense, this invention provides a wood, charcoal or other solid fuel type outdoor barbecue made primarily by modifying discarded truck-type dual wheels that otherwise no longer provide a useful utility. Such discarded wheels do pose an ongoing environmental problem currently, as they are large, heavy, non-decomposable, non-reusable, and are being discarded in ever-increasing numbers due to their age, wear, damage, warping, fractures and other reasons well understood in the transportation industry. Once retired from their conventional, intended use, they pose only a problem and an expense in the matter of what to do with them.

Campgrounds, parks, fairgrounds, picnic areas, rest stops and a multitude of public and private areas have typically provided barbecue facilities to the public, but have experienced a variety of problems resulting of this provision. Firepits are inconvenient to use and clean, and do not contain a cooking fire well. Brick barbecue structures are expensive to make, install, and maintain, are inefficient and costly to repair if damaged. Mass produced, pedestal mounted metal fireboxes are small, have poor air circulation through the fire area, and suffer badly the effects of heat warping through continued use and weather damage from the elements. Making such fire boxes out of the quality metals required to successfully withstand the effects of heat, weather and vandalism is simply not practical, for the costs involved are prohibitive, especially since they are also bought in very large numbers specifically for free use by the public.

Truck wheels, by their very nature and the safety requirements governing their original construction and intended use are formed of very high-quality materials and are of such a heavy gauge that they are very nearly indestructible. Although they may no longer meet the very rigid requirements and safety standards involved in use for highway transportation, these wheels that may be discarded for any variety of reasons suffer virtually no significant damage or warping from constant heating and cooling, no serious deterioration from rusting and other weather related corrosion, and would involve such extreme and concerted efforts by vandals before they would become unusable that vandals would most likely not bother a long-term pursuit of their attempts.

With the foregoing in mind, there is illustrated in the drawings an outdoor barbecue construction embodying the features of my invention. As is seen best in FIG. 2, the basic barbecue body comprises a pair of dual-type vehicle road wheels, one serving as a lower base member 10, the other serving as an upper, firebox member 12. As is understood, each wheel typically comprises a rim member R, an outwardly projecting hub member H extending laterally beyond one side of the rim and defining both one side of the wheel and an opposite, hollow interior portion of the wheel. As shown, in FIGS. 1 and 2, the base wheel 10 is positioned with its rim R disposed on a ground surface so that its hub faces upwardly. The firebox wheel 12 is arranged with its hub facing downwardly, the conventional wheel mounting plates 10', 12' on the terminal end of the hubs providing corresponding confronting support surfaces as is apparent. As shown, one or both tire mounting trim rings adjacent the hub on each wheel may be removed as desired for appearance. The opposite trim rings 14 are typically integral features of the rim.

Truck wheel construction includes a large diameter axle bore 15 centrally located to the wheel mounting plates 10' 12' which, for my purposes, must be closed. Accordingly, a metal plate 16 is secured in this embodiment, as by welding, to one of the wheels, 10', to cover the axle bore through the mounting plate member 10'. The plate may include, as shown, a centrally disposed bore 18 for reasons which will become apparent later.

The axle bore of the upper wheel 12 in this embodiment is also closed by another plate 20. This plate may include, if desired, a centrally located, downwardly projecting pivot pin means, illustrated herein as threaded stud 22 welded thereto, and positioned to extend centrally through the bore 18 of the lower plate 16, which is arranged to be located centrally within the axle bore opening. A threaded, preferably locking-type nut 24 may be provided on the stud to secure the two wheels 10, 12 together, the pivot pin means providing a central axis of rotation about which the upper wheel may be rotated relative to the lower wheel.

Figure 3:
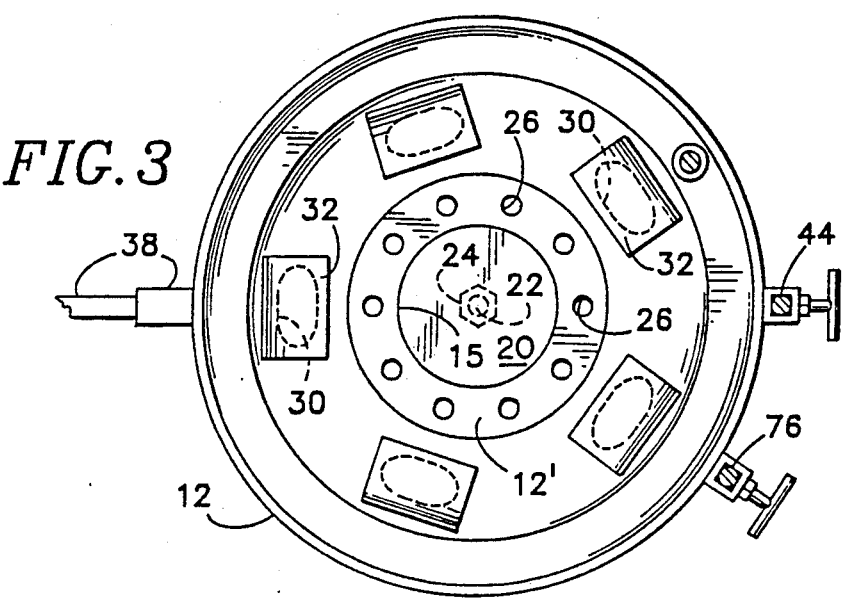
FIG. 3 is a fragmentary top plan view of the outdoor barbecue of FIG. 1 taken along the line 3—3 in FIG. 1, the view illustrating the wheel lug bores in both wheels aligned with each other for permitting full air flow therethrough.
Figure 4:
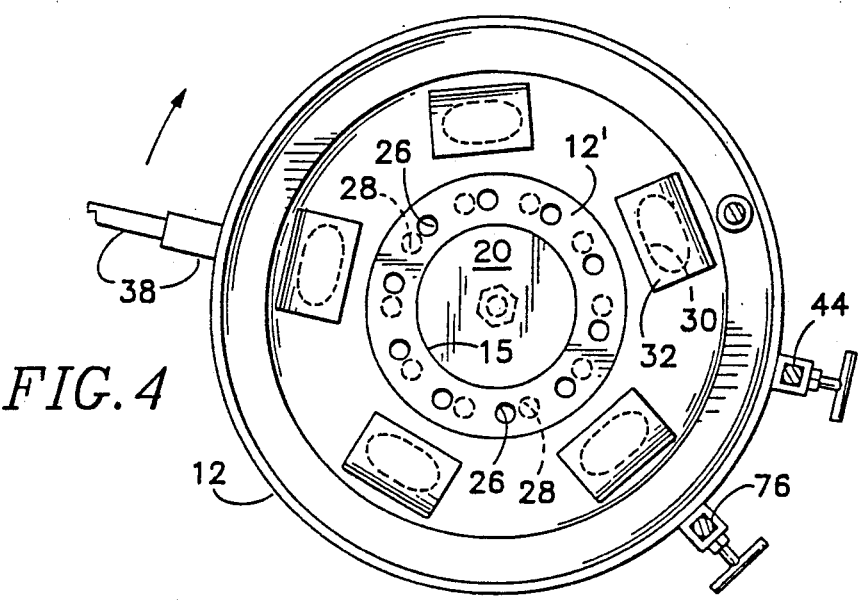
FIG. 4 is a fragmentary top plan view of the outdoor barbecue shown in FIG. 3, but with the upper wheel rotated partially so that the wheel lug bores are moved out of alignment with each other, thereby preventing air flow therethrough, the hidden lug bores associated with the lower wheel shown in broken lines.

As is understood, rotation of the upper wheel 12 relative to the lower wheel 10 moves the lug bores 26 through the mounting plate member 12' of the upper wheel into and out of alignment with the lug bores 28 through the mounting plate member 10' of the stationary, lower wheel 10, seen best in FIGS. 3 and 4. In this manner, the plurality of lug bores 26, 28 provide air passageways which may be infinitely adjusted from fully open (fully aligned as in FIG. 3) to fully closed (fully non-aligned as seen in FIG. 4) for control of air passing upwardly therethrough to the bottom of a fire contained within the hollow interior portion of the up wheel. Airflow will be described later.

Clearly, since the fire is to be contained within the hollow confines of the upper wheel, and air circulation to the underside of the fire is intended to be limited to the controlled flow of air through the lug bores 26, 28, the openings 30 typically provided through the projecting dish wall portion of the hub of the upper wheel are closed, as by welding plates 32 over the openings as shown. This not only prevents airflow therethrough, but also obviously keeps the fire and ashes from passing therethrough. The openings 34 through the lower wheel are left open, thereby permitting free airflow therethrough and into the confines of the lower wheel where the air may pass upward through the lug bores 26, 28 into the area beneath the fire in the controlled fashion just described.

Stop means, illustrated herein as stop bar 36 may be provided if desired to limit the rotation of the upper wheel to a desired range. Since the alignment of the lug bores 26, 28 cannot be seen when the upper wheel contains a fire, it is desirable that the wheel 12 be rotatable only between fully open and fully closed positions, so that "guesswork" is eliminated. Therefore, in the embodiment illustrated, a bar 36 is secured to one of the plates 32 covering one of the openings 30 so as to project downwardly and be received within the corresponding opening 34 in the lower, base wheel 10. As seen in FIGS. 3 and 4, the bar is positioned centrally within the opening when the lug bores 26, 28 are fully aligned, and closed when the bar 36 abuts the end of the opening 34 in either direction. Similarly, the bar 36 could as easily be disposed and configured to abut one end of the opening 34 when the lug bores are fully aligned (open)and abut the opposite end of the opening when the bores are fully mis-aligned (closed). Also, other rotational stop limit means as may be suitable could be employed as well.

Figure 1:
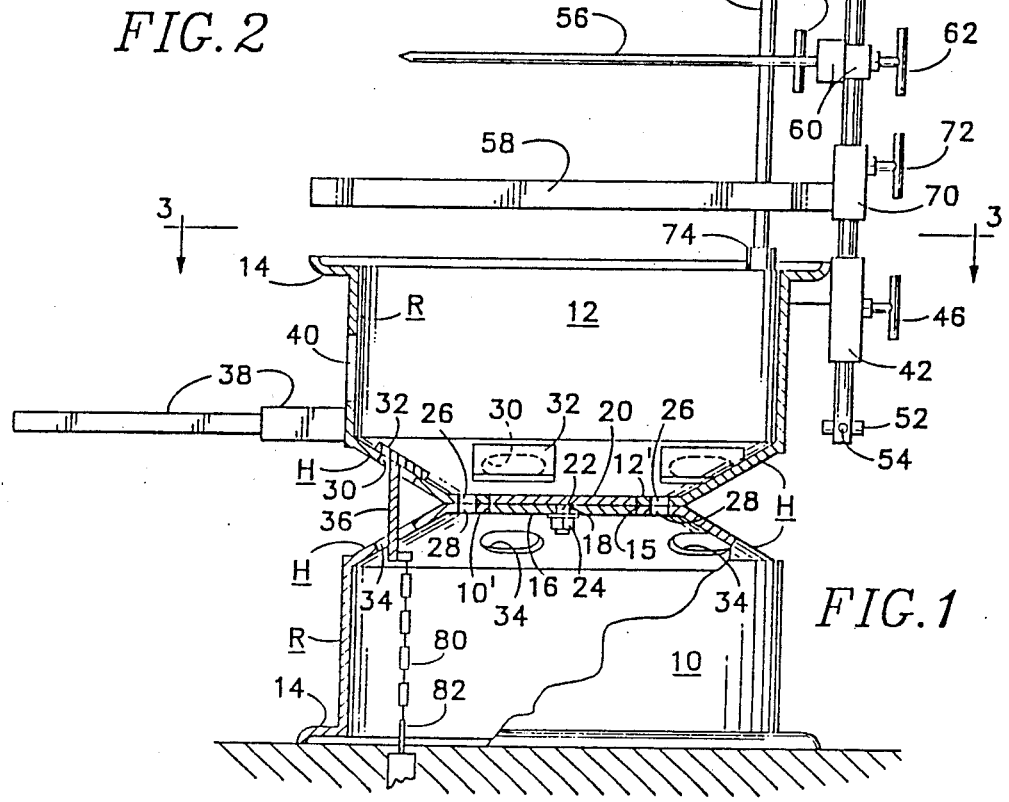
FIG. 1 is a side elevation of an outdoor barbecue embodying the features of my invention, parts being broken away to better illustrate internal and hidden detail.

A handle member 38 is preferably secured to the upper wheel 12, as shown, to facilitate rotation of the wheel without having to grasp the hot wheel surface itself. Also, as shown in FIGS. 1 and 2, the handle may be positioned below a slot 40 that may be provided through the rim of the wheel 12 so that light from a fire will illuminate the handle. Wheels originally constructed to accommodate tube-type tires typically have this slot as a part of their original construction.

The construction of the basic barbecue thus now having been described, reference is made primarily to FIGS. 1 and 2 of the drawings wherein various contemplated cooking implements are shown in conjunction with the barbecue. The drawings show an arrangement intended for use in situations where the barbecue might be subject to theft and vandalism attempts, as in public areas, and as such the cooking implement features are mounted non-removably, or not to the areas' maintenance and repair personnel.

The preferred embodiment of my barbecue securely mounts, as by welding, a bracket 42 configured to support a vertically extending rod or tubular post 44 preferably for adjustable vertical positioning, as by clamping set screw 46. In this embodiment, the upper terminal end of the post 44 mounts, as by permanent weld 48, an enlarged end cap 50. The lower terminal end of the post receives a removable end fitting 52 that may be secured on the post by key lock or set screw 54 preferably having a unique head which is engaged by a tool (not shown) which is not likely to be easily available to the general public. These screws and tools are well known in their art.

Prior to installation of the post on its bracket, various desired implements may be installed on the post as shown. Such implements may include, but are not limited to, a roasting spit 56 and a cooking grill 58. As seen, the spit is preferably permanently mounted on slide bracket 60 that may be vertically and rotationally clamped into desired position by a clamping set screw 62. In this manner, the spit may be positioned above the firebox at desired elevations for proper cooking, and also may be rotated out of the way when it is not being used. Also, the bracket may mount the spit for arcuate pivoting of the spit upwardly to a position (not shown) adjacent the post so that the spit will not present a potential hazard when not in use. The bracket may also be configured, as shown In FIG. 2, to permit lateral adjustment of the spit over the cooking area so that the spit may be used while other cooking is being done as well. To illustrate this, the mounting bracket 60 is configured to mount a sliding, spit mounting bracket 64, the bracket 60 having a slot 66 provided through its front wall. A clamp screw assembly 68 is provided to frictionally secure the spit-mounting bracket 64 in desired positions of lateral adjustment along the bracket 60.

Figure 5:
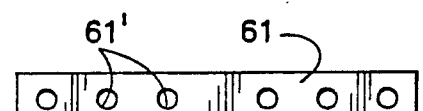
FIG. 5 is a side elevation of a simpler, alternative roasting spit receiver configured to removably receive and support one or more roasting spits.
Figure 6:
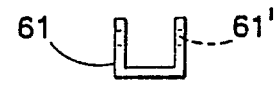
FIG. 6 is an end view of the roasting spit receiver of FIG. 5, as viewed from the right in FIG. 5.

Also, the bracket may alternatively be configured, as shown in FIGS. 5 and 6, to releasably receive a roasting spit, as for example, in cases where spits are not provided and a person must use his own, or where it is doubtful that such removable roasting spits might be stolen. In this embodiment, a spit-receiving bracket 61, in the form of a U-shaped channel, is provided with a desired number of aligned bores 61' through its projecting walls. The bores are dimensioned to be slightly larger in diameter than is the diameter of a standard roasting spit, so that the spit may be inserted freely through the aligned bores and hence held in position extending horizontally over the cooking areas. The channel bracket is mounted on an appropriate post-receiving slide bracket (not shown) similar to those shown in FIG. 1 for vertical and rotational adjustment of the assembly on the post 44.

The grill 58 is mounted on a bracket 70 similar to the bracket 60 described earlier, and also includes a clamping setscrew 72 similar to clamps screw 62 and for the same purpose. The height of the grill above the firebox is adjustable as with the spit, and the grill may also be rotated about the post 44 so that it may be moved out of the way when not in use and when tending the fire.

Preferably, for potential theft and vandalism reasons, the clamping setscrews 46, 62, 68 and 72 are of the type that they cannot be unscrewed all the way and removed, thereby rendering the implements no longer adjustably clamped on the post.

The drawings illustrate that another bracket 74 and clamping setscrew (not shown) similar to the post-mounting bracket 42 and clamping setscrew 46 is secured on the barbecue. This bracket receives, in this embodiment, another tubular post member 76 configured at its upper portion to form a cooking pot hook apparatus 78. The lower terminal end of the post 76 preferably mounts a removable locking end fitting (not shown) similar to the end fitting 52 described earlier. Vertical and rotational adjustment of the post 76 is thereby permitted as previously described in connection with the spit and grill.

Other implements (not shown) as may be desired may be attached to the posts 44 and 76 as has been described in connection with the spit and grill arrangements. Also, it will be appreciated that the pot hook assembly 78 may alternatively be configured to be carried on the post 44 in the same manner as that described with the spit and grill if so desired.

The barbecue apparatus of this invention is preferably secured to an underlying ground surface upon which it is to be disposed. Also, since ashes will tend to sift downward through the lug bores into the area within the lower wheel housing, it is desirable that the assembly be able to be tilted sufficiently so that periodic removal of collected ash, either by broom, shovel or hose be done. Therefore, ideally, a chain 80 or cable (not shown) or other suitable securing means is secured non-removably to a fixture 82 mounted on the ground surface and attached, by lock or other suitable means (not shown) to the wheel assembly, as by securing to the limit stop bar 36 as shown. This prevents disassembly and theft of the entire unit, while also permitting limited access to the underside of the base wheel 10 for cleaning. Other suitable securing means may alternatively be provided as desired or needed.

Figure 7:
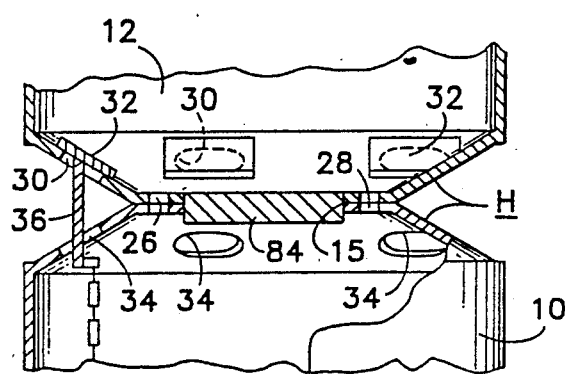
FIG. 7 is a fragmentary side elevation of the hub portion of the barbecue of FIG. 1, parts being broken away to show an alternative axle bore closing plate arrangement secured to the upper wheel, the plate member being received freely within the axle bore of the lower wheel and thereby providing a guide bearing to retain the wheels in aligned, rotatable condition relative to each other.

With regard to FIG. 7 of the drawings, an alternative and simpler wheel interconnecting pivot means is illustrated as an alternative to the structure shown in FIG. 1 and described earlier. In this embodiment, a bearing plate 84 is secured to one wheel, the upper wheel 12 in this embodiment, and configured to project from the terminal end of the hub and be received within the axle bore through the hub of the other wheel, and provide a guiding bearing surface about which one of the wheels may rotate relative to the other. Any means as may be suitable to secure the two wheels rotatively together against separation, as in instances of theft or vandalism, may be employed.

The use and cooking operation of my outdoor barbecue i readily apparent and quite standard. Fuel is placed in the hollow, interior dish portion of the upper wheel 12 and ignited. Airflow is regulated by grasping the handle and rotating the upper wheel to obtain a desired burn rate. That desired airflow is accomplished by regulating the alignment of the lug bores 26, 28 to selectively control the size of the corresponding openings therethrough. When the fire is satisfactory for cooking, one or more of the cooking implements are pivoted into position over the fire and positioned thereabove a desired distance for proper cooking. The airflow can be periodically readjusted as is typical in barbecuing. At nighttime, the handle is illuminated by the fire shining through the slot 40.

From the foregoing it will be apparent to those skilled in the art that the barbecue of this invention provides a unique, durable and highly versatile construction that utilizes existing discarded, very economical wheels for the bulk of the basic base and firebox construction, these wheels being made of very high grade, heavy and strong materials which are not as susceptible to the deleterious effects of continued use, weather and vandalism as is common in barbecue constructions heretofore available. Moreover, the invention provides a novel and unexpected use, once modified, for old, discarded wheels that heretofore have served no other useful purpose, and have provided only a hindrance to the environment and commercial waste management. Additionally, by utilizing already existing wheel constructions that require only minimum modification for this use, the high quality barbecue of this invention can be provided at a low end cost since only minimal labor and materials cost are involved.

Also from the foregoing, it will be apparent to those skilled in the art that various changes, other than those already described may be made in the size, shape, type, number and arrangement of parts described hereinbefore without departing from the spirit of this invention and the scope of the appended claims.

Having thus described my invention in the manner in which it may be used, I claim:

1. A barbecue construction utilizing a pair of conventional dual-type vehicle road wheels each having a circumferential rim member, an outwardly projecting wheel hub member defining a one side of the wheel and an opposite, hollow interior portion of the wheel, a wheel mounting plate member at the outer, terminal end of the hub member, the mounting plate member having a centrally disposed axle bore and a plurality of axle bore-encircling lug bores therethrough, the hub member also including, where provided in a particular wheel construction, wheel hub openings through the projecting dish wall forming the hub member, the barbecue construction comprising:

a) a first wheel of the pair forming a lower, barbecue base member, the wheel arranged for disposition on an underlying ground surface so that its projecting hub member faces upwardly and its opposite, hollow interior side faces downwardly, b) a second wheel of the pair forming an upper, barbecue firebox member, the wheel disposed for support on the first wheel in inverted condition relative to the first wheel so that the mounting plate member on the hub member of the lower wheel engages the mounting plate member on the hub member of the upper wheel and supports the latter in said inverted condition with its opposite, hollow interior facing upwardly and thereby defining a fuel-receiving firebox therein, c) wheel hub opening cover means on the upper wheel, the cover means configured to close the hub openings through the dish wall of the hub member to the passage of air therethrough, d) axle bore cover means engaging at least one of the wheels and configured to close the axle bore to the passage of air therethrough, and e) wheel retaining means interengaging the upper and lower wheel, the retaining means configured to retain the upper wheel rotatably in position on the lower wheel wherein the lug bores through each mounting plate member may be brought into and out of alignment with each other by rotating the upper wheel relative to the lower wheel, whereby to selectively control the upward passage of air permitted through the lug bores and into the firebox beneath a fire contained therein so that the burn rate of a fire may be controlled as desired.

2. The barbecue construction of claim 1 wherein said axle bore cover means comprises a bearing plate member secured to one wheel and configured to be received by the aligned axle bore of the other wheel whereby to close one of the axle bores to the passage of air therethrough and provide a wheel retaining pivot axis about which the upper wheel may be rotated.

3. The barbecue construction of claim 1 wherein each wheel axle bore is closed by a cover means secured thereto, the cover means mounting wheel retaining means configured as an interconnecting pivot pin means positioned to extend through the center of the aligned axle bores to form an axis of rotation of the wheels relative to each other.

4. The barbecue construction of claim 3 wherein said interconnecting pivot pin means is further configured to secure the wheels together against separation from each other.

5. The barbecue construction of claim 1 including limit stop means interengaging the wheels to permit maximum rotation of the upper wheel in one direction to align the corresponding lug bores and maximum rotation in the opposite direction to move the lug bores out of alignment with each other.

6. The barbecue construction of claim 1 including a handle member secured to the upper wheel to facilitate rotation of the upper wheel.

7. The barbecue construction of claim 6 wherein said handle member is secured on the rim member and configured to project outwardly therefrom, and a slot is provided through the rim member adjacent the projecting handle member whereby light from a fire contained in the firebox may pass through the slot to illuminate the handle member.

8. The barbecue construction of claim 1 including at least one cooking implement support means on one of the wheels and configured to mount a cooking implement above the firebox, the cooking implement including, but not limited to, a grill apparatus, a barbecue spit apparatus and a cooking pot holder apparatus.

9. The barbecue construction of claim 8 wherein said support means is configured to adjustably mount a cooking implement at various heights above the firebox.

10. The barbecue construction of claim 9 wherein said support means comprises a vertically extending post member secured to one of the wheels and mounts a sliding clamp member configured to releasably clamp the post member in desired positions along its length, the clamp member mounting a cooking implement for disposition above the firebox.

11. The barbecue construction of claim 10 wherein said sliding clamp member is further configured to mount a cooking implement for lateral movement relative thereto, to adjustably position the implement laterally over the firebox.

12. The barbecue construction of claim 8 wherein said cooking implement support means mounts a cooking implement for movement between a position in which the implement is disposed over the firebox and a position in which it is supported away from the firebox, for unhindered access to the interior of the firebox.

13. A method of making a barbecue using a pair of conventional dual-type vehicle road wheels to form a barbecue base and a firebox, the conventional wheels each having a circumferential rim member, an outwardly projecting wheel hub member defining a one side of the wheel and an opposite, hollow interior portion of the wheel, a wheel mounting plate member at the outer, terminal end of the hub member, the mounting plate member having a centrally disposed axle bore and a plurality of axle bore-encircling lug bores therethrough, the hub member also including, where provided in a particular wheel construction, wheel hub openings through the projecting dish wall forming the hub member, the method comprising:

a) forming a firebox by closing the openings through the dish wall of the hub member of a first wheel of the pair, b) closing the axle bore of at least one of the wheels of the pair, c) connecting the hub members of the first and second wheels rotatably together so that the wheel mounting plate members of each wheel are disposed adjacent each other and aligned with each other along a common, central axis of rotation, d) retaining the wheels together so that rotation of one wheel about said central axis of rotation moves the lug bores of the associated wheel into and out of alignment with the lug bores of the other wheel, and e) supporting the apparatus on an underlying surface with the hollow, interior portion of said second wheel facing downwardly and the hollow interior portion of said first wheel facing upwardly thereby defining a confined, fuel receiving firebox therein.

* * * * *